United States Patent
Khay-Ibbat et al.

(10) Patent No.: US 9,743,324 B2
(45) Date of Patent: Aug. 22, 2017

(54) CELL RESELECTION FOR LINK BUDGET LIMITED DEVICES

(71) Applicant: Apple Inc., Cupertino, CA (US)

(72) Inventors: Samy Khay-Ibbat, San Francisco, CA (US); Tarik Tabet, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/225,012

(22) Filed: Aug. 1, 2016

(65) Prior Publication Data

US 2017/0064593 A1 Mar. 2, 2017

Related U.S. Application Data

(60) Provisional application No. 62/213,596, filed on Sep. 2, 2015.

(51) Int. Cl.
*H04W 36/04* (2009.01)
*H04W 36/30* (2009.01)
(Continued)

(52) U.S. Cl.
CPC .......... *H04W 36/04* (2013.01); *H04W 24/02* (2013.01); *H04W 24/10* (2013.01);
(Continued)

(58) Field of Classification Search
CPC ..... H04W 36/04; H04W 36/30; H04W 48/16; H04W 24/10; H04W 24/02; H04W 88/02;
(Continued)

(56) References Cited

U.S. PATENT DOCUMENTS

| 6,792,284 B1 * | 9/2004 | Dalsgaard ......... H04W 36/0094 370/331 |
| 8,180,344 B2 | 5/2012 | Johansson et al. |

(Continued)

FOREIGN PATENT DOCUMENTS

| EP | 2067370 | 6/2009 |
| GB | 2512382 | 10/2014 |
| WO | 2011143815 | 11/2011 |

OTHER PUBLICATIONS

International Search Report and Written Opinion for International Application No. PCT/US2016/046005, Oct. 28, 2016, pp. 2-13.

*Primary Examiner* — Ajit Patel
(74) *Attorney, Agent, or Firm* — Meyertons Hood Kivlin Kowert & Goetzel, P.C.; Jeffrey C. Hood; Matthew C. Washburn

(57) ABSTRACT

Some embodiments relate to a user equipment (UE) configured to modify at least one signal strength threshold value to provide improved operation for link budget limited devices when performing cell selection or reselection. In some embodiments, the UE may receive a threshold value indicating a minimum received signal strength for camping on a cell. The UE may determine an offset value based on operating parameters of the UE, and may determine a modified threshold value by applying the offset value to the received threshold value. The UE may then compare the modified threshold value to a signal strength measurement of a signal received from a base station associated with the cell. The UE may camp on the cell if the modified threshold value is less than the signal strength measurement, and not camp on the cell if the modified threshold value is greater than the signal strength measurement.

20 Claims, 7 Drawing Sheets

(51) Int. Cl.

| | | |
|---|---|---|
| *H04W 24/02* | (2009.01) | |
| *H04W 48/16* | (2009.01) | |
| *H04W 24/10* | (2009.01) | |
| *H04W 36/00* | (2009.01) | |
| *H04W 88/02* | (2009.01) | |
| *H04W 36/24* | (2009.01) | |
| *H04W 48/18* | (2009.01) | |
| *H04W 48/20* | (2009.01) | |

(52) U.S. Cl.
CPC ....... *H04W 36/0083* (2013.01); *H04W 36/30* (2013.01); *H04W 48/16* (2013.01); *H04W 36/24* (2013.01); *H04W 48/18* (2013.01); *H04W 48/20* (2013.01); *H04W 88/02* (2013.01)

(58) Field of Classification Search
CPC . H04W 36/0083; H04W 48/20; H04W 36/24; H04W 48/18
See application file for complete search history.

(56) References Cited

U.S. PATENT DOCUMENTS

| | | |
|---|---|---|
| 9,241,302 B2 | 1/2016 | Ramachandran et al. |
| 2009/0233600 A1* | 9/2009 | Johansson ............. H04W 36/14 455/435.2 |
| 2012/0236717 A1* | 9/2012 | Saska ................... H04W 48/02 370/235 |
| 2012/0322446 A1* | 12/2012 | Ramachandran ..... H04W 48/18 455/436 |
| 2014/0086173 A1 | 3/2014 | Sadeghi et al. |
| 2014/0171088 A1* | 6/2014 | Edara ................... H04W 36/32 455/440 |
| 2014/0226493 A1 | 8/2014 | Zhou et al. |
| 2015/0172977 A1 | 6/2015 | Koc et al. |
| 2015/0350978 A1* | 12/2015 | Jang ................. H04W 36/0094 455/444 |
| 2016/0073312 A1* | 3/2016 | Sridhar ................ H04W 48/16 370/235 |

* cited by examiner

CELL RESELECTION FOR LINK BUDGET LIMITED DEVICES

PRIORITY INFORMATION

This application claims priority to U.S. provisional patent application Ser. No. 62/213,596, entitled "Cell Reselection for Link Budget Limited Devices," by Tarik Tabet, et al., filed Sep. 2, 2015, which is hereby incorporated by reference in its entirety as though fully and completely set forth herein.

TECHNICAL FIELD

The present application relates to wireless devices, and more particularly to an apparatus, system, and method for determining cell selection and reselection parameters for link budget limited devices.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Wireless communication can be useful for a wide breadth of device classes, ranging from relatively simple (e.g., potentially inexpensive) devices, which may have limited capabilities, to relatively complex (e.g., potentially more expensive) devices, which may have greater capabilities. Such devices may have different characteristics with respect to processing, memory, battery, antenna (power/range, directionality), and/or other capabilities. Devices that exhibit relatively limited reception and/or transmission capabilities (due to device design, device size, battery size, current transmission medium conditions, and/or other factors) may be referred to in some instances as "link budget limited" devices. It would be desirable to provide improved packet switched wireless communication services to various types of mobile devices, including link budget limited devices.

SUMMARY

In light of the foregoing and other concerns, some embodiments relate to a user equipment (UE) configured to modify at least one signal strength threshold value to provide improved operation for link budget limited devices when performing cell selection or reselection.

In some embodiments, a UE may receive from a cellular network a threshold value indicating a minimum received signal strength for camping on a cell. The UE may determine an offset value based on operating parameters of the UE, and may determine a modified threshold value by applying the offset value to the received threshold value. The UE may then compare the modified threshold value to a signal strength measurement of a signal received from a base station associated with the cell. The UE may camp on the cell if the modified threshold value is less than the signal strength measurement, and not camp on the cell if the modified threshold value is greater than the signal strength measurement.

In some embodiments, the UE may determine the modified threshold value in response to determining that the received threshold value is greater than the signal strength measurement.

In some embodiments, the operating procedures upon which the offset value is based may include link budget degradation of the UE. The offset value may be further based on a frequency band of communications between the UE and the base station. The offset value may be further based on information provided by the cellular network. For example, the information provided by the cellular network may be based on a current location of the UE and/or may include information regarding distance between cells.

In other embodiments, a user equipment (UE) may receive from a cellular network one or more threshold values, each threshold value indicating a minimum received signal strength for camping on a respective cell of the cellular network. In response to determining that each of the one or more received threshold values exceeds a respective signal strength measurement of a signal received from a base station associated with the respective cell, the UE may determine, for each of the one or more received threshold values, a respective offset value based at least in part on operating parameters of the UE; modify each of the one or more received threshold values by applying the respective offset value to the threshold value; and in response to determining that at least one modified threshold value is less than a respective signal strength measurement of a signal received from the base station associated with the respective cell, camp on a cell associated with one of the at least one modified threshold values. In response to determining that at least one received threshold value is less than the respective signal strength measurement, the UE may camp on a cell associated with one of the at least one received threshold values. In response to determining that each of the one or more modified threshold values exceeds a respective signal strength measurement, the UE may not camp on any cell associated with a modified threshold value.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
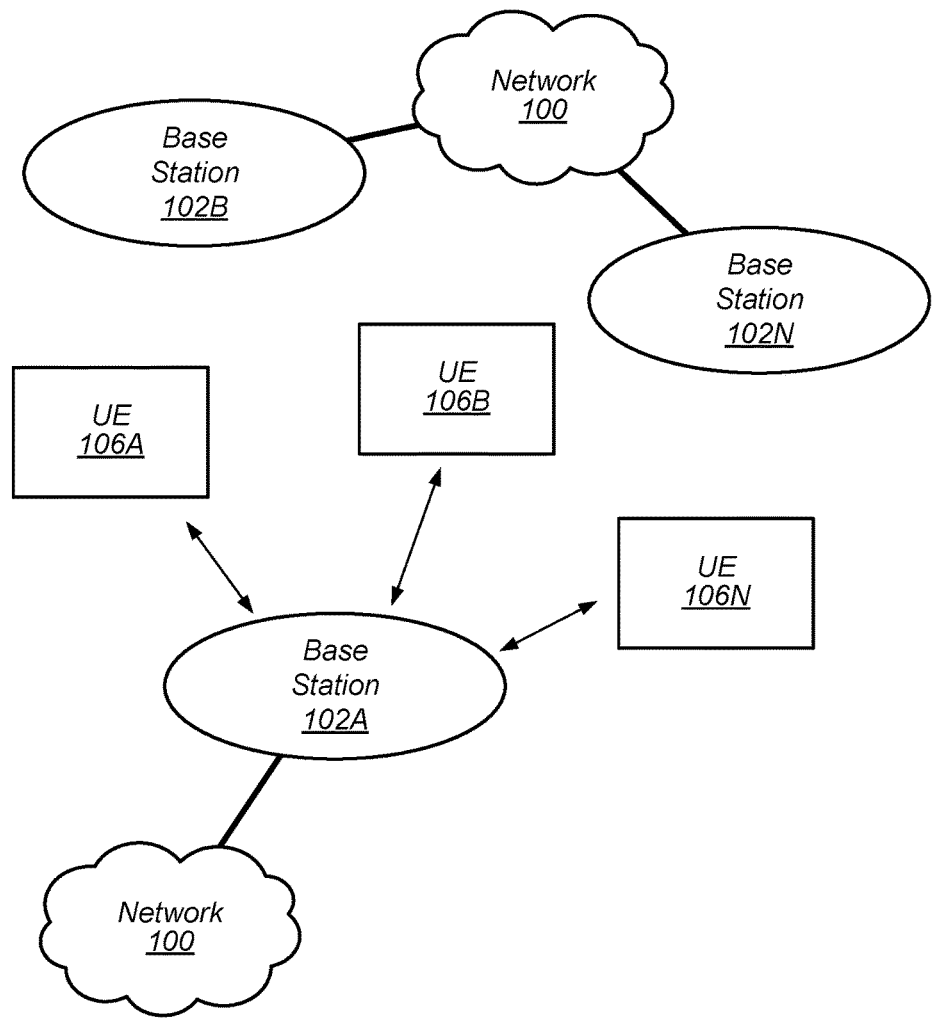
FIG. 1 illustrates an exemplary (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the present subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. §112(f) for that unit/circuit/component.

DETAILED DESCRIPTION OF THE EMBODIMENTS

Acronyms

The following acronyms are used in the present Patent Application:
  UE: User Equipment
  BS: Base Station
  ENB: eNodeB (Base Station)
  GSM: Global System for Mobile Communication
  UMTS: Universal Mobile Telecommunication System
  LTE: Long Term Evolution
  CS: Circuit-switched
  PS: Packet-switched
  CSFB: Circuit-switched fallback
  MME: Mobile Management Entity
  MSC: Mobile Switching Center
  RNC: Radio Network Controller
  RRC: Radio Resource Control
  MT: Mobile Terminating
Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory media, which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, wearable devices (e.g., smart watch, smart glasses), or other handheld devices, etc. In general, the term "UE" or "UE device" can be broadly defined to encompass any electronic, computing, and/or telecommunications device (or combination of devices) that is capable of wireless communication. UE devices may commonly be mobile or portable and easily transported by a user, though in some cases substantially stationary devices may also be configured to perform wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Link Budget Limited—includes the full breadth of its ordinary meaning, and at least includes a characteristic of a wireless device (e.g., a UE) that exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
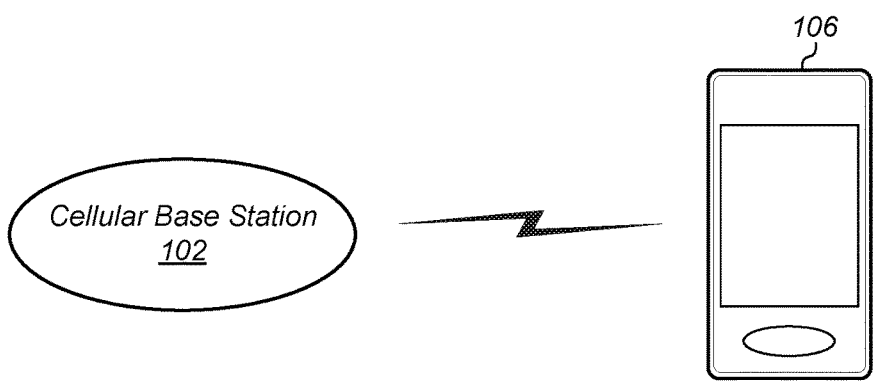
FIG. 2 illustrates a base station in communication with a user equipment (UE), according to some embodiments.

FIGS. 1 and 2—Communication System

FIG. 1 illustrates a simplified example wireless cellular communication system. It is noted that the system of FIG. 1 is merely one example of a possible cellular communication system, and embodiments may be implemented in any of various systems as desired.

As shown, the example wireless cellular communication system includes a base station 102 that communicates over a transmission medium with one or more user devices 106A through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless cellular communication with the UEs 106A through 106N. The base station 102 may also be equipped to communicate with a network 100. Thus, the base station 102 may facilitate communication between the UEs and/or between the UEs and the network 100. The communication area (or coverage area) of each base station may be referred to as a "cell." The base station 102 and the UEs may be configured to communicate over the transmission medium using any of various wireless communication technologies, including cellular radio access technologies (RATs) such as GSM, UMTS, LTE, LTE-Advanced, CDMA, W-CDMA, and any of various 3G, 4G, 5G or future telecom standards. Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards. Other possible wireless communication technologies include wireless local area network (WLAN or WiFi), WiMAX, etc.

In some embodiments, UE 106 may be capable of communicating using multiple radio access technologies (RATs). For example, the UE 106 might be configured to communicate using two or more of GSM, UMTS, LTE, LTE-Advanced CDMA2000, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with the base station 102. As defined above, the UE 106 may be a device with wireless cellular network connectivity such as a mobile phone, a hand-held device, a computer or a tablet, or virtually any type of wireless device. The base station may be a cellular base station that communicates in a wireless cellular manner with one or more UEs.

The UE may include a processing element such as one or more of a processor, an ASIC (application specific integrated circuit), an FPGA (field-programmable gate array) or some combination thereof. The UE, such as the processing element in the UE, may perform any of the methods described herein as being performed by a UE.

The base station may include a processing element such as one or more of a processor, an ASIC (application specific integrated circuit), an FPGA (field-programmable gate array) or some combination thereof. The base station, such as the processing element in the base station, may perform any of the methods described herein as being performed by a base station. Other cellular network devices, described below, may also be configured to perform some or all of the methods described herein, possibly in conjunction with the base station.

In some embodiments, the UE 106 may be configured to communicate using any of multiple wireless communication protocols as described above. The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. In other embodiments, the UE 106 may include separate transmit and/or receive chains (e.g., including separate antennas and other radio components) for each wireless communication protocol with which it is configured to communicate. In still other embodiments, the UE 106 may include one or more radios that are shared between multiple wireless communication protocols, and one or more radios that are used exclusively by a single wireless communication protocol. For example, in one set of embodiments, the UE 106 may include a shared radio for communicating using either of LTE or 1xRTT, and separate radios for communicating using each of Wi-Fi and Bluetooth. Other configurations are also possible.

The UE may be associated with, e.g., subscribe to, a cellular carrier. Examples of cellular carries in the United States include Verizon, AT&T, Sprint, and T-Mobile.

Figure 3:
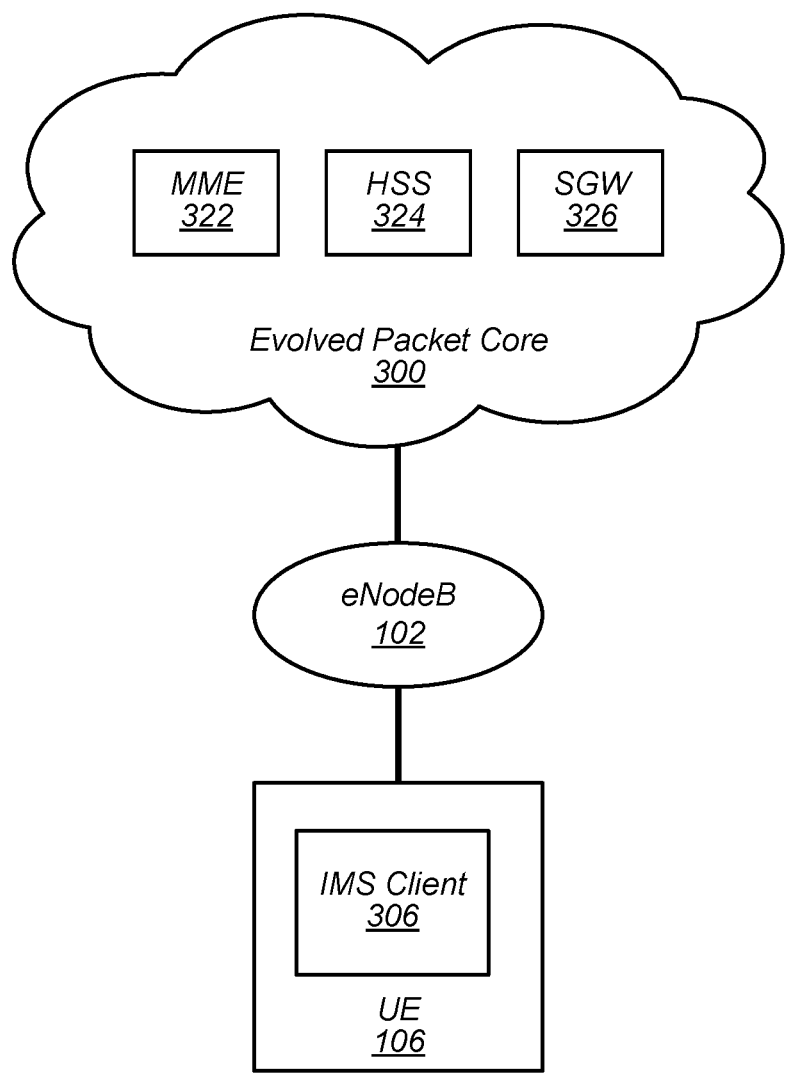
FIG. 3 illustrates an example cellular network system according to some embodiments.

FIG. 3 illustrates an example simplified portion of a wireless communication system that may be used in certain embodiments. As shown, the UE 106 may be in communication with a cellular network, where the cellular network may include a base station 102 and an evolved packet core (EPC) 300, as shown, among other possible elements. The base station is shown in this example embodiment as an eNodeB 102. The UE 106 may communicate in a wireless manner with the base station (eNodeB) 102. In turn, the eNodeB 102 may be coupled to a core network, shown in this example embodiment as an evolved packet core (EPC) 300. As shown, the EPC 300 may include mobility management entity (MME) 322, home subscriber server (HSS) 324, and serving gateway (SGW) 326. The EPC 300 may include various other devices known to those skilled in the art as well.

Operations described herein as being performed by the cellular network may be performed by one or more of the cellular network devices shown in FIG. 3, such as one or more of base station, 102, MME 322, HSS 324, or SGW 326 in EPC 300, among possible others.

Figure 4:
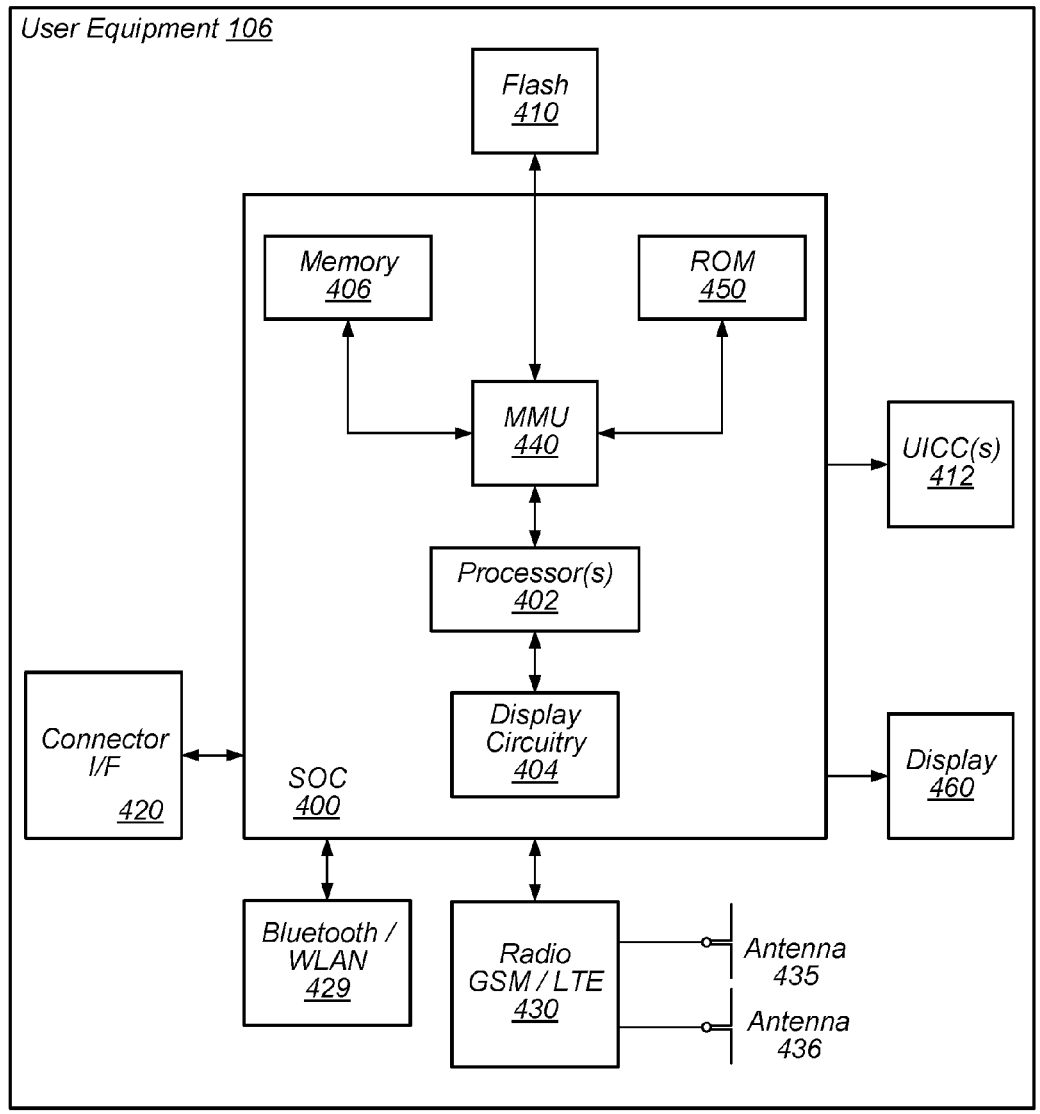
FIG. 4 illustrates an example block diagram of a UE, according to some embodiments.

FIG. 4—Example Block Diagram of a UE

FIG. 4 illustrates an exemplary block diagram of a UE 106. As shown, the UE 106 may include a system on chip (SOC) 400, which may include portions for various purposes. For example, as shown, the SOC 400 may include a processing element, such as processor(s) 402, which may execute program instructions for the UE 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, radio 430, connector I/F 420, and/or display 460. The MMU 440 may be configured to perform memory protection and page table translation or set up. In some embodiments, the MMU 440 may be included as a portion of the processor(s) 402.

In the embodiment shown, ROM 450 may include a bootloader, which may be executed by the processor(s) 402 during boot up or initialization. As also shown, the SOC 400 may be coupled to various other circuits of the UE 106. For example, the UE 106 may include various types of memory (e.g., including Flash memory 410), a connector interface 420 (e.g., for coupling to the computer system), the display 460, and wireless communication circuitry (e.g., for LTE, LTE-A, CDMA2000, GSM, Bluetooth, WiFi, etc.).

The UE device 106 may include at least one antenna, and in some embodiments multiple antennas, for performing wireless cellular communication with base stations and/or wireless communication with other devices. For example, the UE device 106 may use antenna 435 to perform the wireless cellular communication and may use antenna 436 for other wireless communication. As noted above, the UE may be configured to communicate wirelessly using multiple wireless communication standards (multiple RATs) in some embodiments.

As described herein, the UE 106 may include a processing element, e.g., hardware and/or software components for implementing methods according to embodiments of this disclosure. For example, where the UE 106 is link budget limited, the UE 106 may be configured to implement cell selection and/or reselection according to any or all of the embodiments disclosed herein.

The processing element of the UE device 106 may be processor 402 configured to implement part or all of the methods described herein, e.g., by executing program instructions stored on a memory medium (e.g., a non-transitory computer-readable memory medium). In other embodiments, the UE processing element may be configured as a programmable hardware element, such as an FPGA (Field Programmable Gate Array), or as an ASIC (Application Specific Integrated Circuit).

Figure 5:
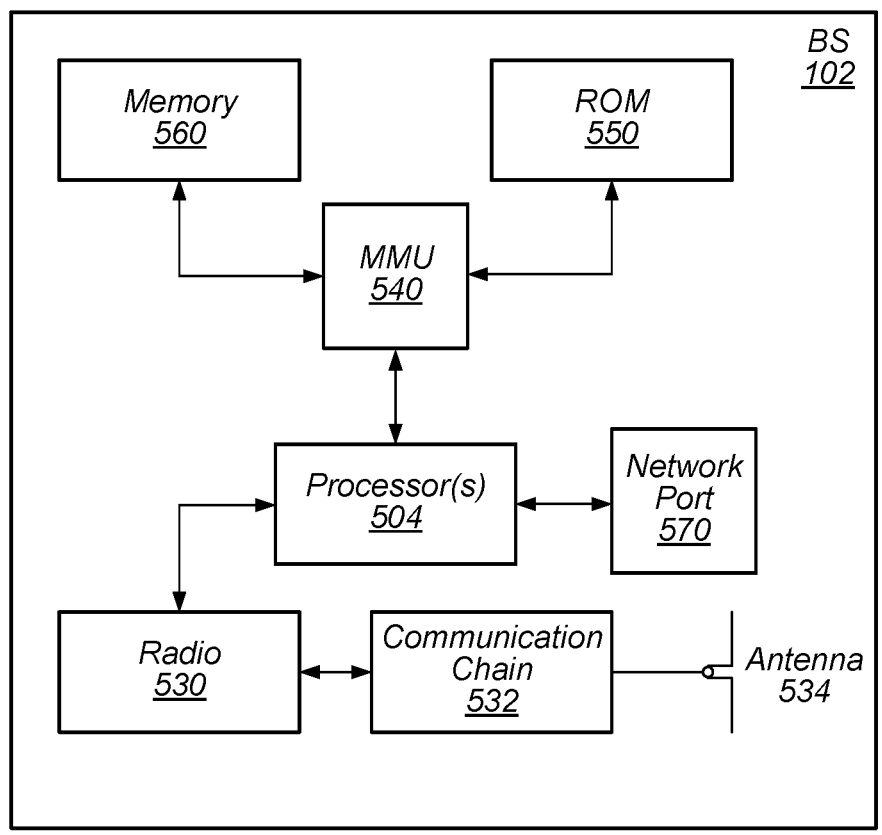
FIG. 5 illustrates an example block diagram of a base station, according to some embodiments.

FIG. 5—Base Station

FIG. 5 illustrates an exemplary block diagram of a base station 102. It is noted that the base station of FIG. 5 is merely one example of a possible base station. As shown, the base station 102 may include a processing element, such as processor(s) 504, which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, GSM, UMTS, LTE, LTE-A, WCDMA, CDMA2000, etc.

The processing element, such as processor(s) 504, of the base station 102 may be configured to implement part or all of the methods described herein, e.g., by executing program instructions stored on a memory medium (e.g., a non-transitory computer-readable memory medium). Alternatively, the processing element may be configured as a programmable hardware element, such as an FPGA (Field Programmable Gate Array), or as an ASIC (Application Specific Integrated Circuit), or a combination thereof.

Cell Parameter Modification

In general, the design and development of cellular networks was performed under the assumption that devices have regular link budget characteristics, e.g., for devices such as smart phones, tablets, etc. However, with the introduction of a new class of devices, in particular wearable devices such as smart watches, which are link budget limited, certain network parameters may result in sub-optimal operation for such devices.

For example, the value qRxLevMin is a cell parameter that indicates the minimum required signal strength, reference signal received power (RSRP) in the cell for idle mode camping. In other words, the value qRxLevMin is the threshold value of RSRP that a traditional UE must see in the downlink channel of a cell before camping on that cell. The qRxLevMin value is read by the UE in SIB1 for cell selection, and values from SIB3/4/5 are used for cell reselection.

The value qRxLevMin may be appropriate for "normal devices", such as smart phones and tablets, for which the relevant telecommunication standard was designed. However, for link budget limited devices, the value set for qRxLevMin may be too aggressive, e.g., may be set at too high of a value. For example, a link budget limited device may have difficulty finding a cell that has this minimum required signal strength. As a result, link budget limited devices may have trouble locating a cell on which to camp and/or may be directed to leave a current cell when no better neighboring cell is present. In the latter instance, the link budget limited device may go out of service when directed by qRxLevMin to move from one cell to another, whereas the device could have remained in service if qRxLevMin had not triggered such a reselection.

In at least some embodiments described herein, the UE is configured to modify at least one signal strength threshold value to provide improved operation for link budget limited devices when performing cell selection/reselection. For example, in one embodiment the UE is configured to modify, or apply an offset to, the qRxLevMin value to adjust the received signal power conditions under which the UE will select a cell or initiate reselection of a cell.

Figure 6:
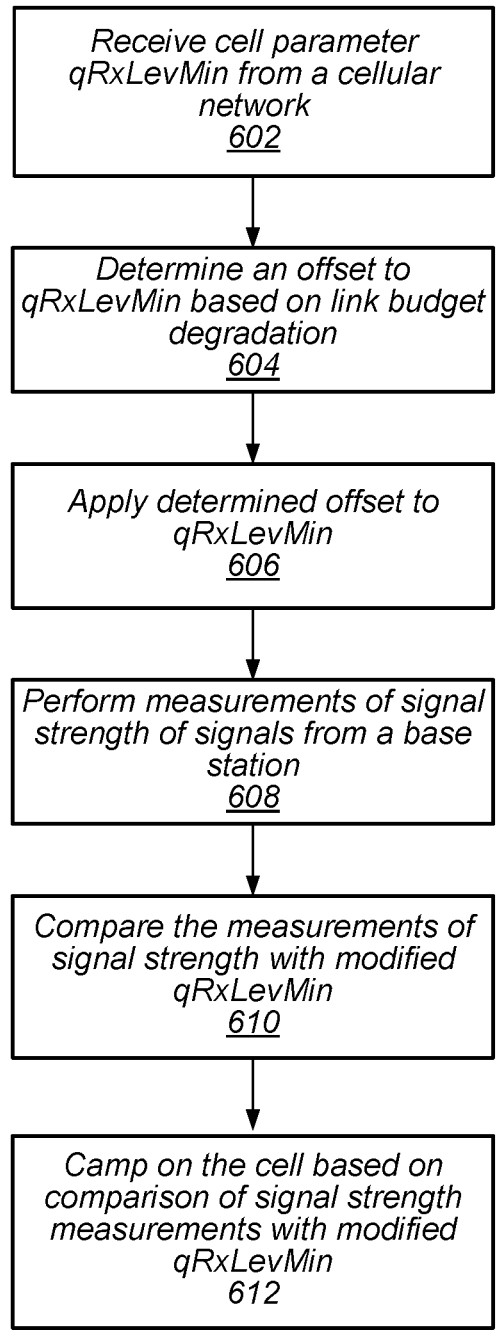
FIG. 6 is a flowchart diagram of a method by which a link budget limited UE may operate to adjust its use of a received cell parameter from the cellular network to improve cell selection and/or reselection, according to some embodiments.

FIG. 6—Cell Selection Using a Signal Strength Threshold Offset

FIG. 6 illustrates an example method by which a link budget limited user equipment (UE) may operate to adjust its use of a received cell parameter from the cellular network to improve cell selection and/or reselection, according to some embodiments. The steps in FIG. 6 may be performed by a UE, such as the UE 106.

At 602 the UE 106 may receive, from a cellular network (e.g., from a base station of the cellular network, such as the base station 102), a cell parameter used by the UE 106 in determining whether the signal strength of signals received from the base station 102 of the cellular network are sufficiently strong to allow camping on a cell associated with the base station 102. For example, the cell parameter may specify a threshold value, such that the network expects that the UE 106 will camp on a cell only if signals received by the UE 106 from the cell have a received signal strength (e.g., RSRP) meeting or exceeding the cell parameter. In some embodiments, the cell parameter is the qRxLevMin received from the base station 102 in system information block 1 (SIB1). In other embodiments, the cell parameter is the qRxLevMin received in SIB4/5 from another base station associated with a cell on which the UE 106 is currently camped.

At 604, the UE 106 may determine (e.g., generate) an offset to the cell parameter. The offset may be based at least in part on operating parameters of the UE 106, such as link budget or link budget degradation. For example, the link budget limited UE 106 may have reduced transmit and/or receive capabilities relative to a UE that is not link budget limited. The UE 106 may determine the amount (e.g., a fixed amount, a proportional amount, etc.) by which the transmit and/or receive capabilities are reduced, and base the offset at least in part on that amount. The offset may be further based on a frequency band of communications between the UE 106 and the base station 102 associated with the cell. For example, the link budget degradation of the UE 106 may vary between frequency bands.

In some scenarios, the UE 106 may determine the offset based at least partly on input received from the cellular network (e.g., from the base station 102). For example, the cellular network may have information regarding network deployment, such as distance between specific cells. Thus, the network may provide information to the UE 106, e.g., via a dedicated field included in a signal received by the UE 106 from one or more base stations, wherein the provided information is relevant to the determination of the offset. For example, the cellular network may provide to the UE 106 information regarding distance between cells, which the UE 106 may use in determining the offset, e.g., based on the assumption that greater distances between cells will likely result in weaker signal strengths, and may thus warrant an increased offset. Alternatively, the cellular network may recommend an offset for use within a certain cell, or for use at a certain location within a cell. In some scenarios, the cellular network may provide this information based on a current location of the UE 106.

In some scenarios, the UE 106 may determine the offset based at least partly on a radio access technology (RAT) with which the cell parameter is associated. For example, if the cell parameter is associated with a preferred cell, e.g., an LTE cell, the offset may be greater than if the cell parameter is associated with a less preferred cell, e.g., a GSM cell. In other scenarios, the UE 106 may not determine the offset based on the RAT with which the cell parameter is associated; i.e., the UE 106 may determine the offset without regard to the RAT.

At 606, the UE 106 may apply the determined offset to the cell parameter. For example, the UE 106 may determine a modified threshold value by applying the offset to the threshold value specified by the cell parameter. As a specific example, the UE 106 may subtract the offset from the threshold value to determine a modified threshold value. As another example, the offset may be a factor, percentage, or ratio, by which the threshold value may be reduced to determine a modified threshold value. In some scenarios, the threshold may be eliminated entirely.

At 608, the UE 106 may perform one or more measurements of signal strength of one or more signals from the base station 102. For example, the one or more measurements of signal strength may include a RSRP measurement.

At 610, the UE 106 may compare at least one of the measurements of the signal strength with the modified cell parameter. For example, the UE 106 may determine whether a signal strength measurement meets or exceeds the modified threshold value.

At 612, the UE 106 may camp on the cell associated with the base station 102 based on the comparison of the at least one of the measurements of the signal strength with the modified cell parameter. For example, if the UE 106 determines (e.g., in response to the UE 106 determining) that the signal strength measurement exceeds (or meets) the modified threshold value, then the UE 106 may camp on the cell. By contrast, if the UE 106 determines (e.g., in response to the UE 106 determining) that the signal strength measurement is less than (or does not exceed) the modified threshold value, then the UE 106 may not camp on the cell. In this way, the link budget limited UE 106 may adapt the cell selection parameters configured by the cellular network, which may have been optimized for non-link budget limited devices.

The term "camp" as used herein is intended to include the full breadth of its ordinary meaning as known in the art, and at least includes registering with a cell to access one or more available services.

It should be understood that the method illustrated in FIG. 6 may be implemented regardless of whether the UE 106 is currently camped on a cell.

It should be understood that the steps illustrated in FIG. 6 are merely exemplary, and that various steps may be removed or reordered. For example, determining the offset at 604 may be performed prior to, or concurrently with, step 602. Similarly, performing measurements of signal strength at 608 may be performed prior to, or concurrently with, any of steps 602-606.

Figure 7:
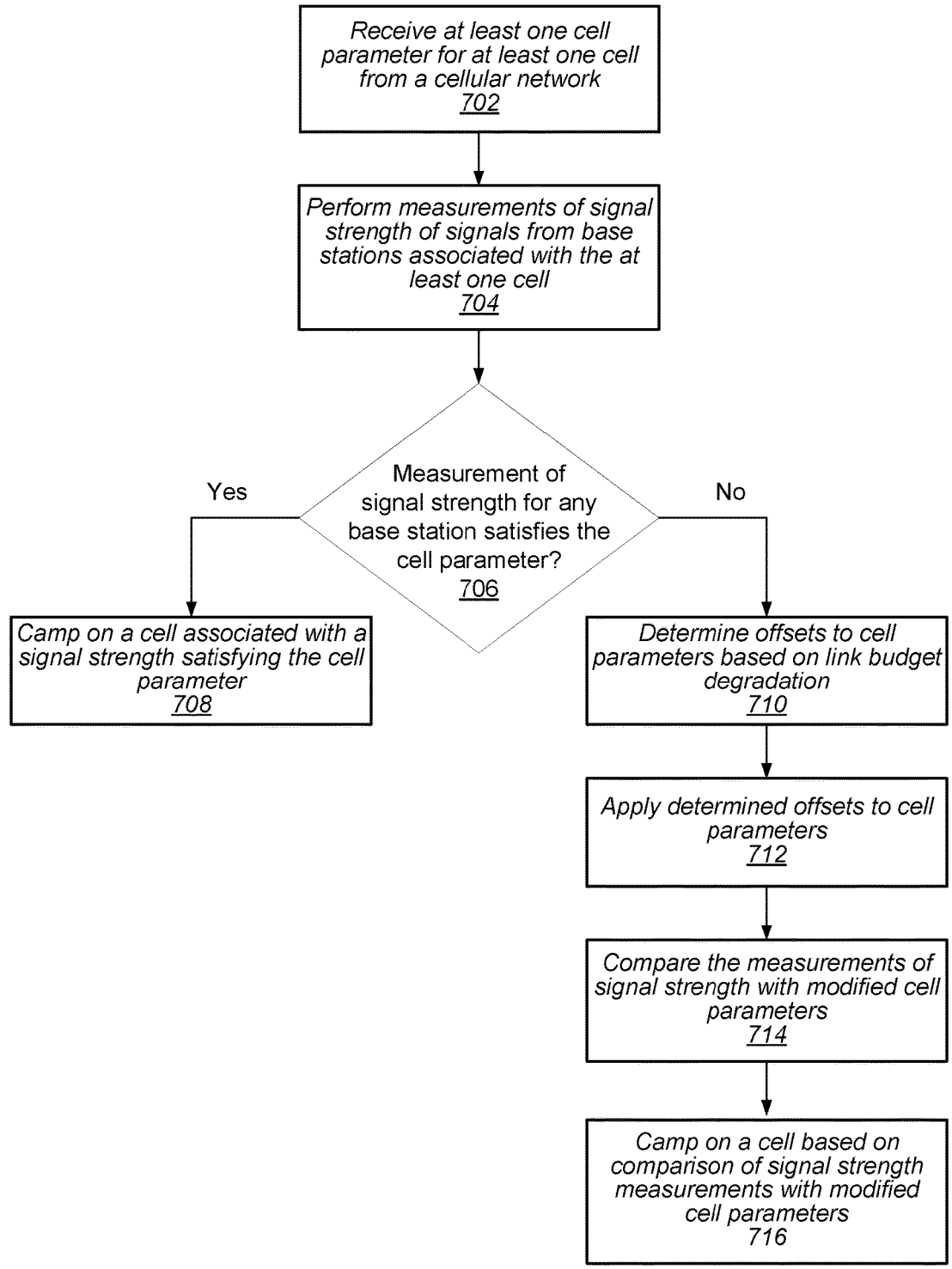
FIG. 7 is a flowchart diagram of a method by which a link budget limited UE may operate to adjust its use of a received cell parameter from the cellular network in response to determining that the signal environment is weak, according to some embodiments.

FIG. 7—Using a Signal Strength Threshold Offset in a Weak Signal Environment FIG. 7 illustrates an example method by which a link budget limited user equipment (UE) may operate to adjust its use of a received cell parameter from the cellular network in response to determining that the signal environment is weak, according to some embodiments. The steps in FIG. 7 may be performed by a UE, such as the UE 106.

At 702 the UE 106 may receive, from a cellular network (e.g., from one or more base station of the cellular network, such as the base station 102), at least one cell parameter, each cell parameter associated with a respective cell of the cellular network. Each cell parameter may be used by the UE 106 in determining whether the signal strength of signals received from a base station of the associated cell are sufficiently strong to allow camping on the associated cell. For example, a cell parameter may specify a threshold value, such that the network expects that the UE 106 will camp on the associated cell only if signals received by the UE 106 from that cell have a received signal strength (e.g., RSRP) meeting or exceeding the cell parameter. In some embodiments, one or more of the cell parameters are the qRx-LevMin values received in system information block 1 (SIB1) from associated base stations. Additionally, or alternatively, one or more of the cell parameters are the qRx-LevMin values received in SIB4 or SIB5 from a base station of a neighboring cell (e.g., a cell on which the UE is currently camped).

At 704, the UE 106 may perform one or more measurements of signal strength of one or more signals from base stations of the cells associated with the at least one cell parameter. For example, the one or more measurements of signal strength may include RSRP measurements for the base stations.

At 706, the UE 106 may determine whether any of the measured signal strengths satisfy the cell parameter for the respective associated cell. For example, the UE 106 may compare the measurements of the signal strength with the associated cell parameters, and may determine whether any signal strength measurement meets or exceeds the threshold value specified for the associated cell.

If the UE 106 determines at 706 that at least one of the measured signal strengths satisfies the cell parameter for the respective associated cell, then at 708 the UE 106 may camp on a cell associated with one of those measured signal strengths. The cell selected for camping may be determined based on the measured signal strengths and/or other factors as known in the art.

If the UE 106 determines at 706 that none of the measured signal strengths satisfy the cell parameter for the respective associated cell, then the UE 106 may modify the cell parameter for link budget limited operation. Specifically, at 710, the UE 106 may determine (e.g., generate) an offset for each of the received cell parameters. Each offset may be similar to (and may be determined in a manner similar to) that discussed with regard to step 604 of FIG. 6. In some scenarios, the UE 106 may determine a single offset for some or all of the received cell parameters. In other scenarios, a respective offset may be determined for each of the received cell parameters.

In some scenarios, the UE 106 may determine the offsets based at least partly on input received from the cellular network. For example, the cellular network may have information regarding network deployment, such as distance between specific cells. Thus, the network may provide information to the UE 106, e.g., via one or more dedicated fields included in a signal received by the UE 106 from one or more base stations, wherein the provided information is relevant to the determination of the offset. For example, the cellular network may provide to the UE 106 information regarding distance between cells, which the UE 106 may use in determining the offsets, e.g., based on the assumption that greater distances between cells will likely result in weaker signal strengths, and may thus warrant an increased offset. Alternatively, the cellular network may recommend an offset for use within a certain cell, or for use at a certain location within a cell. In some scenarios, the cellular network may provide this information based on a current location of the UE 106.

At 712, the UE 106 may apply the determined offsets to the cell parameters. For example, the UE 106 may determine one or more modified threshold value by applying the offsets to the threshold values specified by the cell parameters. As a specific example, the UE 106 may subtract an offset from an associated threshold value to determine a modified threshold value. As another example, an offset may be a factor, percentage, or ratio, by which an associated threshold value may be reduced to determine a modified threshold value. In some scenarios, the thresholds may be eliminated entirely.

At 714, the UE 106 may compare the measurements of the signal strength with the modified cell parameters. For example, the UE 106 may determine whether a signal strength measurement meets or exceeds the modified threshold value. In some scenarios, the UE 106 may compare the measurements of the signal strength obtained at 704 with the modified cell parameters. In other scenarios, the UE 106 may perform one or more updated measurements of signal strength of one or more signals from base stations of the cells associated with the at least one cell parameter, and may compare the updated measurements with the modified cell parameters.

At 716, the UE 106 may camp on a cell based on the comparison of the at least one of the measurements of signal strength with the modified cell parameters. For example, if the UE 106 determines (e.g., in response to the UE 106 determining) that at least one of the signal strength measurements exceeds (or meets) the associated modified threshold value, then the UE 106 may camp on the associated cell. If multiple signal strength measurements meet their associated modified threshold values, then the UE 106 may determine which cell to camp on based on the measured signal strengths and/or other factors as known in the art. For example, the UE 106 may camp on the cell having the greatest measured signal strength or the cell for which the measured signal strength exceeds its associated modified threshold value by the largest margin.

By contrast, if the UE 106 determines (e.g., in response to the UE 106 determining) that most or all of the signal strength measurements are less than (or do not exceed) their associated modified threshold values, then the UE 106 may not camp on any of the cells.

In this way, the link budget limited UE 106 may adapt the cell selection parameters configured by the cellular network, which may have been optimized for non-link budget limited devices. Specifically, according to the method illustrated in FIG. 7, this adaptation of the cell selection parameters may occur only in situations in which a link budget limited UE 106 would otherwise enter a "no service" state because of the absence a cell with RSRP above qRxLevMin.

It should be understood that the method illustrated in FIG. 7 may be implemented regardless of whether the UE 106 is currently camped on a cell.

It should be understood that the steps illustrated in FIG. 7 are merely exemplary, and that various steps may be removed or reordered. For example, step 704 may be performed prior to, or concurrently with, step 702. Similarly, steps 706-708 may be omitted, in which case steps 702 and 704 may be performed prior to, or concurrently with, steps 710 and 712.

In a similar embodiment, if, at step 706, the UE 106 determines that none of the measured signal strengths satisfy the cell parameter for the respective associated cell, then the UE 106 may entirely remove the requirement for satisfying the cell parameter, such as meeting a threshold signal strength. In that case, the UE 106 may attempt to camp on an available cell, without executing steps 710-716. The cell to be camped on may be selected according to measured signal strengths and/or other factors as known in the art.

Figure 8:
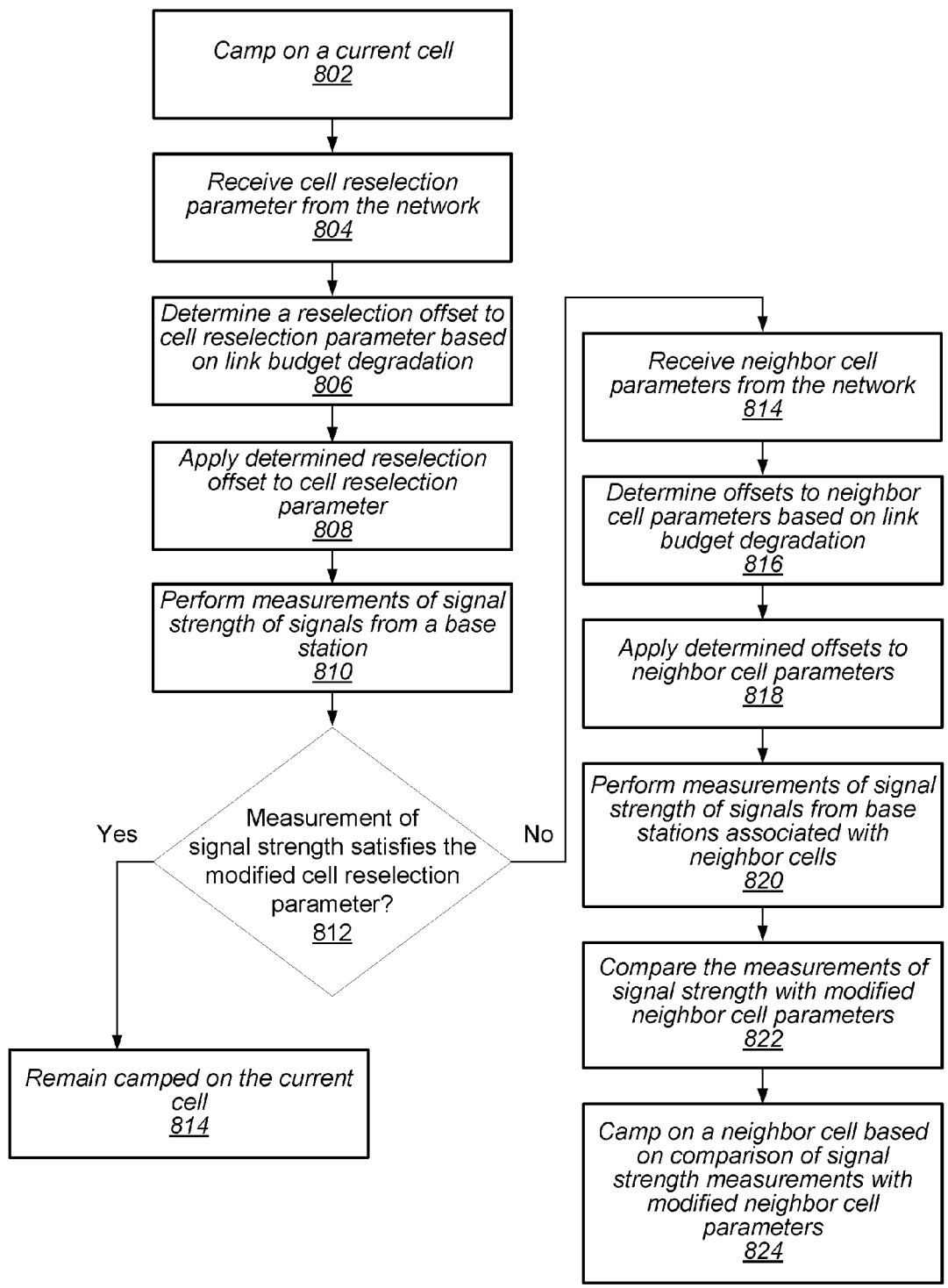
FIG. 8 is a flowchart diagram of a method by which a link budget limited UE may operate to adjust its use of received cell parameters from the cellular network to improve cell reselection, according to some embodiments.

FIG. 8—Cell Reselection Using Signal Strength Threshold Offsets

FIG. 8 illustrates an example method by which a link budget limited user equipment (UE) may operate to adjust its use of received cell parameters from the cellular network to improve cell reselection, according to some embodiments. The steps in FIG. 8 may be performed by a UE, such as the UE 106.

At 802 the UE 106 may camp on a current cell. For example, camping on the current cell may be performed according to the method of either of FIG. 6 or FIG. 7, or according to other methods as known in the art.

At 804, the UE 106 may receive, from a cellular network (e.g., from a base station of the cellular network, such as the base station 102), a cell reselection parameter for use by the UE 106 in determining whether the signal strength of signals received from a base station of the current cell are sufficiently weak to prompt the UE 106 to search for neighbor cells on which to camp. For example, the cell reselection parameter may specify a reselection threshold value, such that the network expects that the UE 106 will begin cell reselection if signals received by the UE 106 from the base station of the current cell have a received signal strength (e.g., RSRP) below (or not greater than) the cell reselection parameter. In some embodiments, the cell reselection parameter is the qRxLevMin received from the base station in system information block 3 (SIB3).

At 806, the UE 106 may determine (e.g., generate) a reselection offset to the cell reselection parameter. The reselection offset may be based at least in part on operating parameters of the UE 106, such as link budget or link budget degradation. For example, the link budget limited UE 106 may have reduced transmit and/or receive capabilities relative to a UE 106 that is not link budget limited. The UE 106 may determine the amount (e.g., a fixed amount, a proportional amount, etc.) by which the transmit and/or receive capabilities are reduced, and base the reselection offset at least in part on that amount. The reselection offset may be further based on a frequency band of communications between the UE 106 and the base station associated with the current cell. For example, the link budget degradation of a UE 106 may vary between frequency bands.

In some scenarios, the UE 106 may determine the reselection offset based at least partly on input received from the cellular network. For example, the cellular network may have information regarding network deployment, such as distance between specific cells. Thus, the network may provide information to the UE 106, e.g., via a dedicated field included in a signal received by the UE 106 by one or more base stations, wherein the provided information is relevant to the determination of the reselection offset. For example, the cellular network may provide to the UE 106 information regarding distance between cells, which the UE 106 may use in determining the reselection offset, e.g., based on the assumption that greater distances between cells will likely result in weaker signal strengths, and may thus warrant an increased reselection offset. Alternatively, the cellular network may recommend a reselection offset for use within a certain cell, or for use at a certain location within a cell. In some scenarios, the cellular network may provide this information based on a current location of the UE 106.

At 808, the UE 106 may apply the determined reselection offset to the cell reselection parameter. For example, the UE 106 may determine a modified reselection threshold value by applying the reselection offset to the reselection threshold value specified by the cell reselection parameter. As a specific example, the UE 106 may subtract the reselection offset from the reselection threshold value to determine a modified reselection threshold value. As another example, the reselection offset may be a factor, percentage, or ratio, by which the reselection threshold value may be reduced to determine a modified reselection threshold value. In some scenarios, the reselection threshold may be eliminated entirely.

At 810, the UE 106 may perform one or more measurements of signal strength of one or more signals from the base station of the current cell. For example, the one or more measurements of signal strength may include a RSRP measurement.

At 812, the UE 106 may determine whether the measurements of signal strength satisfy the modified cell reselection parameter. For example, the UE 106 may compare the measurements of the signal strength with the modified reselection parameter, and may determine whether the signal strength measurements meet or exceed the modified reselection threshold value.

If the UE 106 determines (e.g., in response to the UE 106 determining) at 812 that the measured signal strengths satisfy the modified cell reselection parameter, then at 814 the UE 106 may continue to camp on the current cell. The UE 106 may periodically repeat this method to ensure that received signal strength continues to satisfy the modified cell reselection parameter. When repeating the method after performing step 814, the UE 106 may opt not begin at step 802, but may instead begin at any of steps 804, 806, 808, or 810. For example, the UE 106 may reuse values of the cell reselection parameter, the reselection offset, and/or the modified cell reselection parameter obtained in a previous iteration of the method.

If the UE 106 determines (e.g., in response to the UE determining) at 812 that a measured signal strength does not satisfy the modified cell reselection parameter, then the UE may initiate cell reselection. At 814, the UE may receive, from the cellular network, at least one neighbor cell parameter, each neighbor cell parameter associated with a respective neighbor cell of the cellular network. Each neighbor cell parameter may be used by the UE 106 in determining whether the signal strength of signals received from a base station of the associated neighbor cell are sufficiently strong to allow camping on the associated neighbor cell. For example, a neighbor cell parameter may specify a neighbor threshold value, such that the network expects that the UE 106 will camp on the associated neighbor cell only if signals received by the UE 106 from that neighbor cell have a received signal strength (e.g., RSRP) meeting or exceeding the neighbor cell parameter.

In some embodiments, one or more of the neighbor cell parameters are the qRxLevMin values received in SIB4 or SIB5 from the base station of the current cell. Additionally, or alternatively, one or more of the neighbor cell parameters are the qRxLevMin values received in SIB1 directly from a base station of the associated neighbor cell. For example, if neighbor cell information provided in SIB4 and SIB5 from the current cell do not include qRxLevMin values, then the UE 106 may read qRxLevMin values in SIB1 of the neighboring cells directly upon detection.

At 816, the UE 106 may determine a neighbor offset for one or more (e.g., each) of the received neighbor cell parameters. Each neighbor offset may be similar to the reselection offset discussed with regard to step 806 above. In some scenarios, the UE 106 may utilize the determined reselection offset as one or more of the neighbor offsets. In other scenarios, the neighbor offsets may differ from the reselection offset. For example, the UE 106 may apply different factors or inputs in determining the neighbor offsets than were used in determining the reselection offset. In some scenarios, the UE 106 may determine a single neighbor offset for some or all of the received neighbor cell parameters. In other scenarios, a respective neighbor offset may be determined for each of the received neighbor cell parameters.

At 818, the UE 106 may apply the determined neighbor offsets to the neighbor cell parameters. For example, the UE 106 may determine one or more modified neighbor threshold value by applying the neighbor offsets to the neighbor threshold values specified by the neighbor cell parameters. As a specific example, the UE 106 may subtract a neighbor offset from an associated neighbor threshold value to determine a modified neighbor threshold value. As another example, an offset may be a factor, percentage, or ratio, by which an associated neighbor threshold value may be reduced to determine a modified neighbor threshold value. In some scenarios, the neighbor thresholds may be eliminated entirely.

At 820, the UE 106 may perform one or more measurements of neighbor signal strength of one or more signals from base stations of the neighbor cells associated with the neighbor cell parameters. For example, the one or more measurements of signal strength may include RSRP measurements for the base stations.

At 822, the UE 106 may compare the measurements of the neighbor signal strength with the respective modified neighbor cell parameters. For example, the UE 106 may determine whether a neighbor signal strength measurement meets or exceeds the modified neighbor threshold value.

At 824, the UE 106 may camp on a cell based on the comparison of the at least one of the measurements of neighbor signal strength with the modified neighbor cell parameters. For example, if the UE 106 determines (e.g., in response to the UE 106 determining) that at least one of the neighbor signal strength measurements exceeds (or meets) the associated modified neighbor threshold value, then the UE 106 may camp on the associated neighbor cell. If multiple neighbor signal strength measurements meet their associated modified neighbor threshold values, then the UE 106 may determine which cell to camp on based on the measured neighbor signal strengths and/or other factors as known in the art. By contrast, if the UE 106 determines (e.g., in response to the UE 106 determining) that all of the neighbor signal strength measurements are less than (or do not exceed) their associated modified neighbor threshold values, then the UE 106 may not camp on any of the neighbor cells. For example, in that case, the UE 106 may remain camped on the current cell.

In some scenarios, the neighbor cells discussed with regard to steps 814-824 may include the current cell. For example, the UE 106 may receive a cell parameter (i.e., a neighbor cell parameter) associated with the current cell that is distinct from the cell reselection parameter. For example, the neighbor cell parameter of the current cell may be the qRxLevMin received from the base station of the current cell in SIB1. When determining a cell on which to camp at step 824, the current cell may thus be considered along with the other neighboring cells, despite the measurements of the signal strength of the current cell having failed to satisfy the modified cell reselection parameter at step 812.

For example, the cell reselection parameter (and the modified cell reselection parameter) may be greater than the neighbor cell parameter (and the modified neighbor cell parameter) associated with the current cell. Thus, the UE 106 may initiate reselection when the signal strength of the current cell falls below a first threshold, but before the signal strength falls below a second threshold that would cause the UE 106 to drop the current cell. In such scenarios, the UE 106 may find that the current cell is nevertheless the best option among the various available neighboring cells. Therefore, at step 824, the UE 106 may continue to camp on the current cell.

In this way, the link budget limited UE 106 may adapt the cell reselection parameters configured by the cellular network, which may have been optimized for non-link budget limited devices.

It should be understood that the steps illustrated in FIG. 8 are merely exemplary, and that various steps may be removed or reordered. For example, step 806 may be performed prior to, or concurrently with, step 804. Similarly, step 814 may be performed concurrently with step 804, or any other time prior to step 818.

In some scenarios, steps 806 and 808 may be omitted, in which case, the UE 106 may, at 812, determine whether the measurements of signal strength satisfy the received cell reselection parameter, rather than the modified cell reselection parameter. Alternatively, steps 816 and 818 may be omitted, in which case, the UE 106 may, at 822, compare the measurements of the neighbor signal strengths with the respective received neighbor cell parameters, rather than the respective modified neighbor cell parameters.

As noted above, the UE 106 may periodically repeat this method to ensure that received signal strength continues to satisfy the modified cell reselection parameter. When repeating the method, the UE may opt not begin at step 802, but may instead begin at any of steps 804, 806, 808, or 810. For example, the UE may reuse values of the cell reselection parameter, the reselection offset, and/or the modified cell reselection parameter obtained in a previous iteration of the method. Similarly, the UE 106 may reuse values of the neighbor reselection parameters, neighbor offsets, and/or modified neighbor reselection parameters, such that any of steps 814, 816, and/or 818 may be omitted.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE), comprising:
a radio configured to perform wireless cellular communications; and
at least one processing element coupled to the radio;
wherein the UE is configured to:
receive from a cellular network, via the radio, a threshold value indicating a minimum received signal strength for camping on a cell of the cellular network;
determine an offset value based at least in part on operating parameters of the UE;
determine a modified threshold value by applying the offset value to the threshold value;
compare the modified threshold value to a signal strength measurement of a signal received from a base station associated with the cell;
camp on the cell in response to determining that the modified threshold value is less than the signal strength measurement; and
not camp on the cell in response to determining that the modified threshold value is greater than the signal strength measurement.

2. The UE of claim 1, wherein the operating parameters upon which the offset value is based comprise link budget degradation of the UE.

3. The UE of claim 2, wherein the offset value is further based on a frequency band of communications between the UE and the base station.

4. The UE of claim 2, wherein the offset value is further based on information provided by the cellular network.

5. The UE of claim 4, wherein the information provided by the cellular network is based on a current location of the UE.

6. The UE of claim 1, wherein the UE is configured to determine the modified threshold value in response to determining that the received threshold value is greater than the signal strength measurement.

7. A non-transitory computer-readable medium storing software instructions that, when executed by a processor of a user equipment (UE), cause the UE to:
receive, from a cellular network, a threshold value indicating a minimum received signal strength for camping on a cell of the cellular network;
determine an offset value based at least in part on operating parameters of the UE;
determine a modified threshold value by applying the offset value to the threshold value;
compare the modified threshold value to a signal strength measurement of a signal received from a base station associated with the cell;
camp on the cell in response to determining that the modified threshold value is less than the signal strength measurement; and
not camp on the cell in response to determining that the modified threshold value is greater than the signal strength measurement.

8. The non-transitory computer-readable medium of claim 7, wherein the operating parameters upon which the offset value is based comprise link budget degradation of the UE.

9. The non-transitory computer-readable medium of claim 8, wherein the offset value is further based on a frequency band of communications between the UE and the base station.

10. The non-transitory computer-readable medium of claim 8, wherein the offset value is further based on information provided by the cellular network.

11. The non-transitory computer-readable medium of claim 10, wherein the information provided by the cellular network is based on a current location of the UE.

12. The non-transitory computer-readable medium of claim 7, wherein the software instructions cause the UE to determine the modified threshold value in response to determining that the received threshold value is greater than the signal strength measurement.

13. A user equipment (UE), comprising:
a radio configured to perform wireless cellular communications; and
at least one processing element coupled to the radio;
wherein the UE is configured to:
- receive from a cellular network, via the radio, one or more threshold values, each threshold value indicating a minimum received signal strength for camping on a respective cell of the cellular network; and
- in response to determining that each of the one or more received threshold values exceeds a respective signal strength measurement of a signal received from a base station associated with the respective cell:
  - determine, for each of the one or more received threshold values, a respective offset value based at least in part on operating parameters of the UE;
  - modify each of the one or more received threshold values by applying the respective offset value to the threshold value; and
  - in response to determining that at least one modified threshold value is less than a respective signal strength measurement of a signal received from the base station associated with the respective cell, camp on a cell associated with one of the at least one modified threshold values.

14. The UE of claim 13, wherein the UE is further configured to:
- in response to determining that at least one received threshold value is less than the respective signal strength measurement, camp on a cell associated with one of the at least one received threshold values.

15. The UE of claim 13, wherein the UE is further configured to:
- in response to determining that each of the one or more modified threshold values exceeds a respective signal strength measurement, not camp on any cell associated with a modified threshold value.

16. The UE of claim 13, wherein the operating parameters comprise link budget degradation of the UE.

17. The UE of claim 16, wherein each respective offset value is further based on a frequency band of communications between the UE and the base station associated with the respective cell.

18. The UE of claim 13, wherein at least one offset value is further based on information provided by the cellular network.

19. The UE of claim 18, wherein the information provided by the cellular network is based on a current location of the UE.

20. The UE of claim 18, wherein the information provided by the cellular network comprises information regarding distance between cells.

* * * * *